United States Patent
Miyamoto

(10) Patent No.: US 6,940,839 B2
(45) Date of Patent: Sep. 6, 2005

(54) DOWNLINK POWER CONTROL METHOD AND CDMA COMMUNICATION SYSTEM INCORPORATING THE CONTROL METHOD

(75) Inventor: Yukie Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 855 days.

(21) Appl. No.: 09/776,851

(22) Filed: Feb. 6, 2001

(65) Prior Publication Data

US 2002/0001292 A1 Jan. 3, 2002

(30) Foreign Application Priority Data

Feb. 7, 2000 (JP) .................................... 2000-029054

(51) Int. Cl.⁷ .............................................. H04B 7/216
(52) U.S. Cl. ........................ 370/335; 370/318; 370/332
(58) Field of Search .............................. 455/522, 67.11, 455/226.1, 226.3; 370/332, 333, 441, 252, 311, 318, 342, 335

(56) References Cited

U.S. PATENT DOCUMENTS

| | | | |
|---|---|---|---|
| 5,345,598 A | * | 9/1994 | Dent ........................... 455/522 |
| 5,386,589 A | * | 1/1995 | Kanai .......................... 455/423 |
| 5,794,129 A | | 8/1998 | Komatsu |
| 5,930,242 A | * | 7/1999 | Mimura ....................... 370/331 |
| 5,933,782 A | | 8/1999 | Nakano et al. |
| 5,946,346 A | * | 8/1999 | Ahmed et al. ............... 375/219 |
| 6,118,983 A | * | 9/2000 | Egusa et al. .................. 455/69 |
| 6,181,738 B1 | * | 1/2001 | Chheda et al. ............... 375/224 |
| 6,226,526 B1 | * | 5/2001 | Sakoda et al. ............... 455/522 |
| 6,341,214 B2 | * | 1/2002 | Uesugi ......................... 455/69 |
| 6,393,005 B1 | * | 5/2002 | Mimura ....................... 370/335 |
| 6,526,031 B1 | * | 2/2003 | Zaff et al. ................... 370/335 |
| 6,650,904 B1 | * | 11/2003 | Lin et al. ..................... 455/522 |

FOREIGN PATENT DOCUMENTS

| | | |
|---|---|---|
| EP | 0 682 418 A2 | 11/1995 |
| EP | 0 887 948 A2 | 12/1998 |
| EP | 1 045 530 A1 | 10/2000 |
| GB | 2 353 670 A | 2/2001 |
| JP | 10-112683 | 4/1998 |
| WO | WO 97/08847 | 3/1997 |

OTHER PUBLICATIONS

United Kingdom Search Report dated Nov. 14, 2001.
3GPP RAN 25.214 V1.3.1 (1999–09.

* cited by examiner

Primary Examiner—Ajit Patel
Assistant Examiner—Steven Blount
(74) Attorney, Agent, or Firm—McGinn & Gibb, PLLC

(57) ABSTRACT

The transmit power of a CDMA downlink channel is controlled from a base station by receiving a command signal from a mobile station requesting it to decrease the transmit power of the downlink channel. In response, the base station decreases the transmit power if a hypothetically decremented value of the transmit power is higher than a nominal lower limit of its power control range, and further decreases the transmit power if the downlink channel still has a quality higher than a specified value at the mobile station even when the hypothetically decremented value is lower than the nominal lower limit. The base station sets the transmit power equal to the nominal lower limit if the hypothetically decremented value is lower than the nominal lower limit and the downlink channel still has a quality higher than the specified value at the mobile station.

16 Claims, 4 Drawing Sheets

INTERRUPT ROUTINE

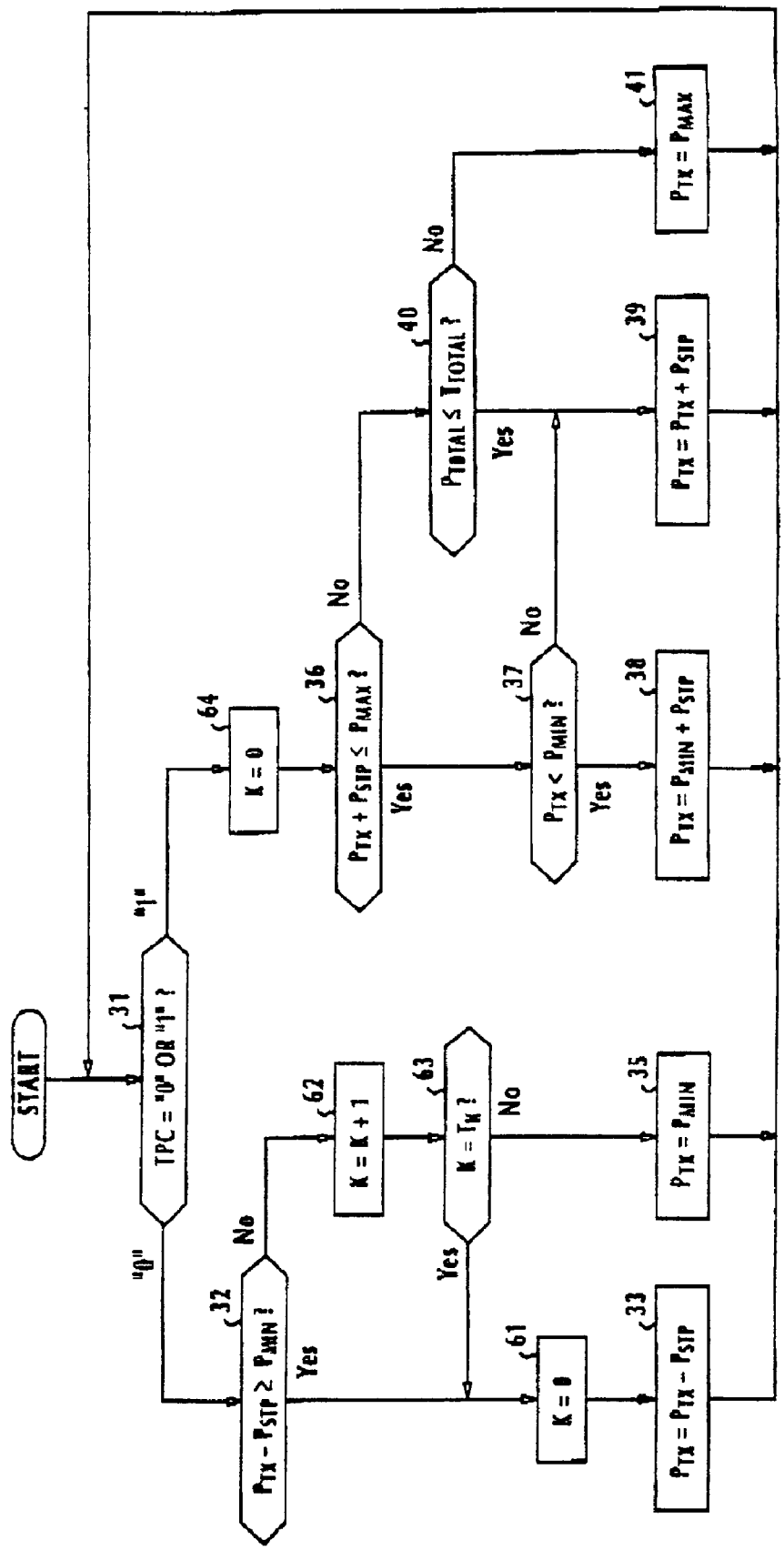

DOWNLINK POWER CONTROL METHOD AND CDMA COMMUNICATION SYSTEM INCORPORATING THE CONTROL METHOD

BACKGROUND OF THE INVENTION

1. Field of the Invention

The present invention relates generally to CDMA (code division multiple access) communication systems, and more specifically to a downlink power control method and a system using the same.

2. Description of the Related Art

A transmit power control scheme for downlink (base-to-mobile) channels of CDMA communication systems is described in "3GPP RAN (3rd Generation Partnership Project Radio Access Network) 25.214 v1.3.1". According to this document, each mobile station constantly monitors its downlink channel and determines its signal-to-interference ratio (SIR). The mobile station compares the SIR value with a prescribed target value and transmits a TPC (transmit power control) command signal through an uplink channel, requesting the base station to increase or decrease the power level of the downlink channel. The power level of a downlink channel is varied by a predetermined incremental unit for each TPC command signal. Power control will be repeatedly performed if the base station repeatedly receives TPC command signals until the upper or lower limit of a power control range is reached. The minimum power control limit is determined in consideration of the fact that, when a power decrease takes place in a downlink channel of excellent signal quality, the signal quality at the reduced level still allows the base station to respond to a possible degradation which may subsequently occur due to a sudden movement of the mobile station. The maximum power control limit of the base station is determined by taking account of interference between mobile stations which would be caused by possible racing conditions in which they compete for power increase. The number of channels allocated to the base station is also a determining factor of the maximum limit of the control range.

However, one shortcoming of the prior art scheme is that, since power control is effected in a specified range that prevents the base station to transmit its power at a level below the minimum power control limit, those mobile stations that are located near the base station would receive power more than what they actually need for their downlink channels. As a result, useful energy resource of a base station is wasted. Another shortcoming of the prior art is that, due to the presence of the upper limit, those mobile stations that are located far off the base station would receive power less than what they actually need for their downlink channels even when the transmit power level of the base station still has a sufficient amount of allowance with respect to its maximum power control limit.

SUMMARY OF THE INVENTION

It is therefore an object of the present invention to provide a transmit power control technique for a CDMA base station to achieve full and efficient utilization of its power resource.

According to a first aspect, the present invention provides a method of controlling the transmit power of a plurality of CDMA downlink channels from a base station within a control range between a nominal lower limit and a nominal upper limit, comprising the steps of receiving, at the base station, a command signal from a mobile station requesting the base station to decrease the transmit power of a downlink channel, and decreasing, at the base station, the transmit power of the downlink channel if the downlink channel has a quality higher than a specified threshold value at the mobile station.

According to a second aspect, the present invention provides a method of controlling the transmit power of a plurality of CDMA downlink channels from a base station within a control range between a nominal lower limit and a nominal upper limit, comprising the steps of receiving, at the base station, a command signal from the mobile station requesting the base station to increase the transmit power of the downlink channel, and increasing the transmit power if total transmit power of the downlink channels is lower than a specified threshold value.

According to a third, specific aspect, the present invention provides a method of controlling the transmit power of a plurality of CDMA downlink channels from a base station within a control range between a nominal lower limit and a nominal upper limit, comprising the steps of (a) receiving, at the base station, a command signal from a mobile station requesting the base station to decrease the transmit power of a downlink channel, (b) decreasing the transmit power of the downlink channel if a hypothetically decremented value of the transmit power is higher than the nominal lower limit, (c) decreasing the transmit power of the downlink channel if the quality of the downlink channel at the mobile station is lower than a specified threshold value even when the hypothetically decremented value is lower than the nominal lower limit; and (d) setting the transmit power of the downlink channel equal to the nominal lower limit if the hypothetically decremented value is lower than the nominal lower limit and the quality of the downlink channel at the mobile station is lower than the specified threshold value, receiving, at the base station, a command signal from the mobile station requesting the base station to increase the transmit power of the downlink channel, increasing the transmit power of the downlink channel if a hypothetically incremented value of the transmit power is lower than the nominal upper limit, increasing the transmit power if total transmit power of the downlink channels is lower than a specified threshold value even when the hypothetically incremented value is greater than the nominal upper limit, and setting the transmit power equal to the nominal upper limit if the hypothetically incremented value is greater than the nominal upper limit and the total transmit power is equal to or higher than the specified threshold value.

According to a further specific aspect, the present invention provides a method of controlling the transmit power of a plurality of CDMA downlink channels from a base station within a control range between a nominal lower limit and a nominal upper limit, comprising the steps of receiving, at the base station, a command signal from a mobile station requesting the base station to decrease the transmit power of a downlink channel, decreasing the transmit power of the downlink channel if a hypothetically decremented value of the transmit power is higher than the nominal lower limit, incrementing a count value as long as the hypothetically decremented value is lower than the nominal lower limit, setting the transmit power of the downlink channel to the nominal lower limit if the count value is smaller than a predetermined count value, and decreasing the transmit power of the downlink channel if the count value reaches the predetermined count value.

BRIEF DESCRIPTION OF THE DRAWINGS

The present invention will be described in further detail with reference to the accompanying drawings, in which:

FIG. 4 is a flowchart of the operation of the transmit power controller according to a modified embodiment of the present invention.

DETAILED DESCRIPTION

Figure 1:
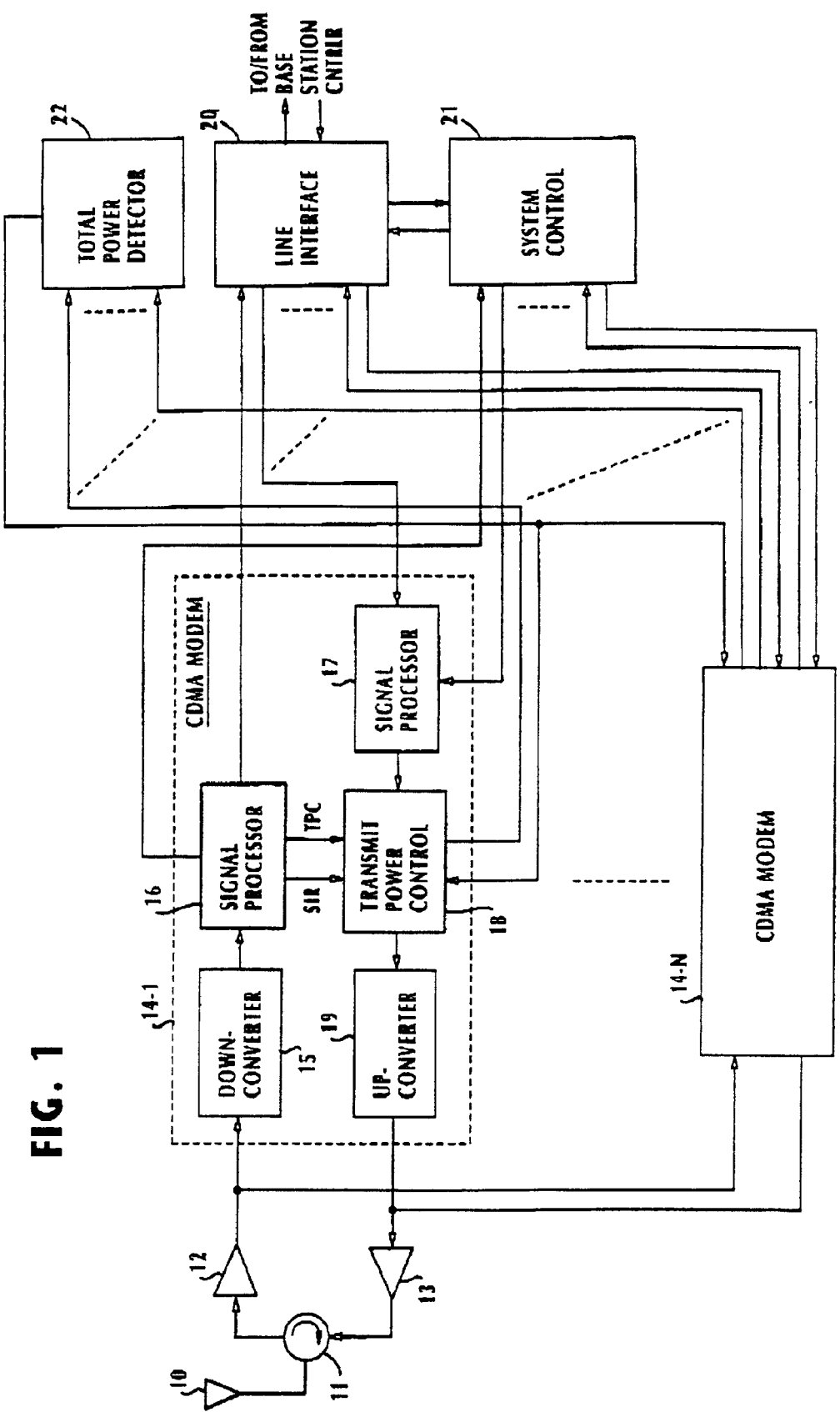
FIG. 1 is a block diagram of a CDMA cell-site base station of the present invention.

Referring now to FIG. 1, there is shown a CDMA (code division multiple access) cell-site base station of the present invention. The base station is comprised of a plurality of CDMA modems 14-1 through 14-N provided in number corresponding to the number of wireless channels allocated to the base station. The base station includes an antenna 10, a duplexer 11, an uplink RF amplifier 12 and a downlink RF amplifier 13, which form a common antenna system shared by all modems 14. The cell-site station is connected to a base station controller of the mobile network (not shown) via a line interface 20 that interfaces between the modems 14 and a system controller 21. A total power detector 22 is provided to detect the total power of downlink transmissions from the base station by summing the transmit power levels of all modems.

Each CDMA modem 14 includes a down-converter 15, an uplink signal processor 16, a downlink signal processor 17, a transmit power controller 18 and an up-converter 19.

The base station operates with the antenna 10 to establish CDMA channels. Uplink spread spectrum signals from mobile stations contain control information such as SIR (signal to interference ratio) and TPC (transmit power control) codes produced by the mobile stations. The mobile-transmitted signals, detected by antenna 10, pass through the duplexer 11 to the RF amplifier 12. After the RF amplification, the signals are supplied to the down-converter 15 where the radio frequency signals are converted to IF (intermediate frequency) signals or baseband signals. The output of down-converter 15 is fed to the uplink signal processor 16, which includes a circuit for despeading the signal from a mobile station that uses the same pseudonoise code as that of the modem in the uplink direction and for detecting the transmitted SIR and TPC codes contained in the transmitted signal as well as a control signal necessary for call processing. The SIR and TPC codes detected by the signal processor 16 are supplied to the transmit power controller 18 and the call processing signal is applied to the system controller 21. The uplink traffic signal of the mobile station is supplied from the signal processor 16 to the line interface 20 and transmitted to the network.

Downlink signals from the network are respectively coupled to the modems 14 by the line interface 20. Downlink signal processor 17 processes the downlink signal by spreading it with a pseudonoise code determined by the system controller 21 to produce a downlink spread spectrum signal. The power level of the downlink spread spectrum signal is controlled by the transmit power controller 18. The power-control signal is converted to a downlink radio frequency in an up-converter 19, power-amplified by the RF amplifier 13 and transmitted from the antenna 10.

As will be described in detail, the transmit power controller 18 determines the transmit power of the modem based on the SIR (signal to interference ratio) and TPC (transmit power control) values from the uplink signal processor 16 and the current total power level of the base station supplied from the total power detector 22.

Figure 2:
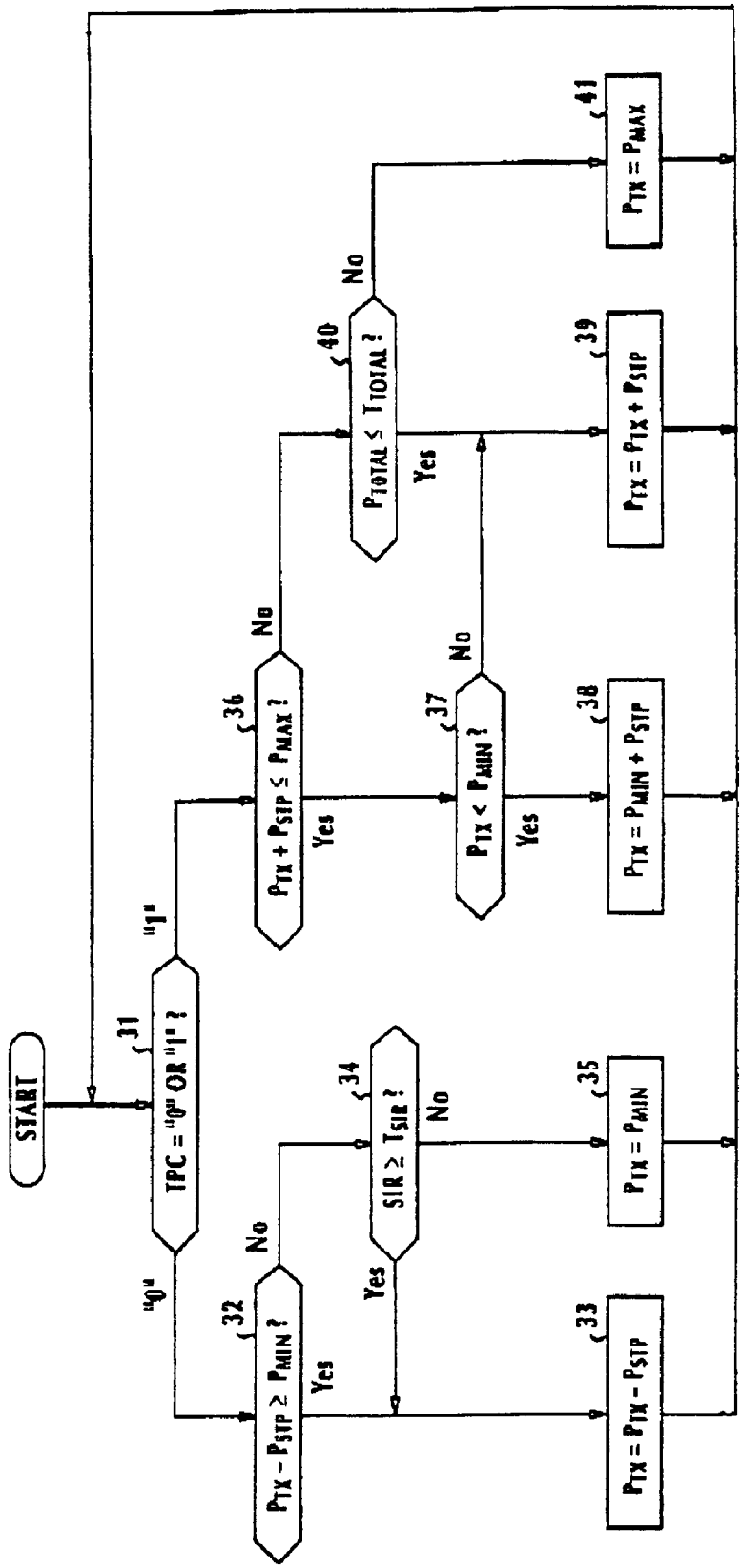
FIG. 2 is a flowchart of the operation of the transmit power controller of FIG. 1 according to one embodiment of the present invention.

In a first embodiment of the present invention, the transmit power controller 18 operates according to the flowchart of FIG. 2.

When SIR and TPC codes of a given mobile station are detected and supplied from the uplink signal processor 16, the operation of the controller 18 begins with decision step 31 to check to see if TPC is a "0" or a "1".

If TPC=0, it is determined that the downlink channel of the given mobile station is of excellent quality, requesting that the power level of that channel be decremented, and flow proceeds to decision step 32. In this step, the transmit power controller 18 calculates the difference in decibel (dB) between the current base-station power level $P_{TX}$ and a stepsize power value $P_{STP}$ and determines whether the difference is equal to or greater than the minimum power level $P_{MIN}$ of the controllable range of the base station. If the decision at step 32 is affirmative, flow proceeds to step 33 to decrement the power level $P_{TX}$ by the stepsize value $P_{STP}$ and returns to the starting point of the routine. If the decision at step 32 is negative, flow proceeds to step 34 to compare the SIR value with a predetermined threshold value $T_{SIR}$.

If $SIR \geq T_{SIR}$, it is determined that because of the fact that the downlink channel of the given mobile station is of excellent quality the transmit power of the base station can be lowered below the minimum level $P_{MIN}$. In other words, the downlink channel still has an excellent quality to tolerate a reduction of power. If this is the case, flow proceeds from step 34 to step 33 to decrement the current transmit power lever $P_{TX}$ by the stepsize value $P_{STP}$.

If $SIR < T_{SIR}$, it is determined that a power reduction of the downlink channel would cause a quality degradation. In this case, flow proceeds to step 35 to set the current power level $P_{TX}$ equal to the minimum level $P_{MIN}$, and returns to the starting point of the routine.

If TPC=1 (step 31), it is determined that the downlink channel of the given mobile station is of poor quality, requesting that the power level of that channel be incremented. In this case, flow proceeds to decision step 36, where the transmit power controller 18 calculates a sum (dB) of the current base-station power level $P_{TX}$ and the stepsize value $P_{STP}$ and determines whether the calculated sum is equal to or smaller than the maximum power level $P_{MAX}$ of the controllable power range of the base station.

If the decision at step 36 is affirmative, flow proceeds to step 37 to determine if the current transmit power level $P_{TX}$ is lower than the minimum power level $P_{MIN}$. Such a lower-than-minimum situation can occur if the controller 18 has previously executed step 33 following an affirmative decision at step 34. If this is the case, the controller 18 proceeds from step 37 to step 38 to calculate a sum of minimum power level $P_{MIN}$ and the stepsize value $P_{STP}$ and set the current power level $P_{TX}$ equal to the sum $P_{MIN}+P_{STP}$, and returns to the starting point of the routine.

If the decision at step 37 reveals that a higher-than-minimum situation exists, flow proceeds to step 39 to increment the power level $P_{TX}$ by the stepsize value $P_{STP}$ and then returns to the starting point of the routine.

If the decision at step 36 is negative, the controller 18 compare the output signal from the total power detector 22 with a threshold value $T_{TOTAL}$ (step 40). If the current total power $P_{TOTAL}$ is equal to or lower than the threshold value $T_{TOTAL}$, it is determined that the base station has a sufficient amount of margin to increase the power level of the downlink channel without causing interference with other mobile stations. If this is the case, the controller 18 proceeds to step 39 to increment the current power level $P_{TX}$ by the stepsize value $P_{STP}$.

If the decision at step 40 is negative, flow proceeds to step 41 to set the current power level equal to the maximum power level $P_{MAX}$ and returns to the starting point of the routine.

Figure 3:
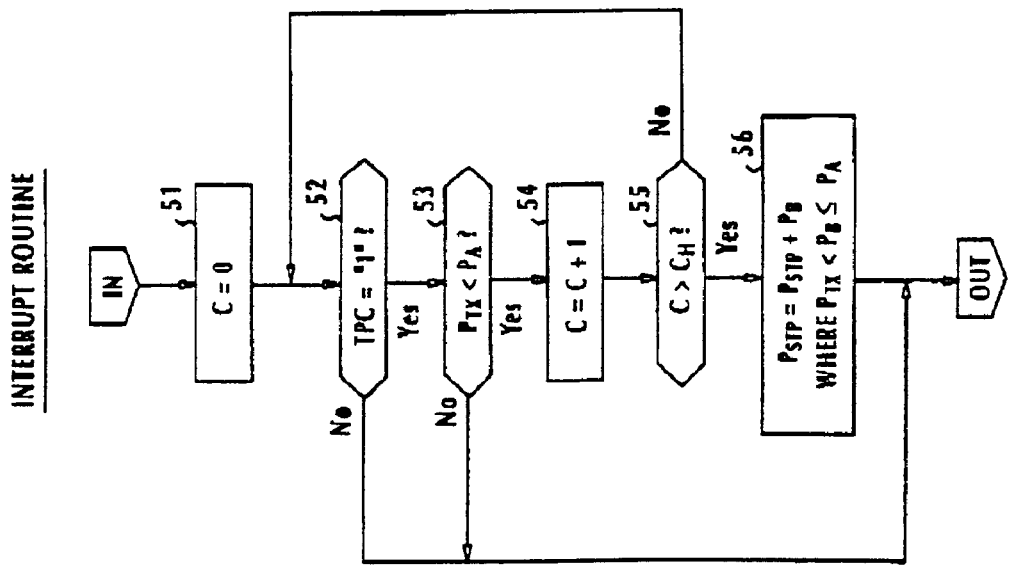
FIG. 3 is a flowchart of an interrupt routine.

While mention has been made of an embodiment in which the incremental stepsize is of constant value, the present invention could equally be as well applied to an embodiment in which the stepsize is adaptively controlled in an interrupt routine as shown in FIG. 3.

In FIG. 3, the interrupt routine begins with initialization step 51 in which the controller 18 sets a count value C to 0, and determines, at step 52, if the TPC value of a downlink channel is "1", requesting the base station to increase its power level. If so, the controller 18 proceeds to step 53 to check to see if the current power level $P_{TX}$ of the downlink channel is lower than a threshold level $P_A$. If $P_{TX}$ is smaller than $P_A$, the controller 18 proceeds to step 54 to increment the count value C by one and compares the count value C to a threshold value $C_H$ at step 55. If the count value C is smaller than the threshold value $C_H$, steps 52 to 54 are repeated until the count value C exceeds the threshold value $C_H$. If such a lower-than-threshold ($P_{TX} < P_A$) condition continues for an interval corresponding to the threshold value $C_H$, the controller 18 proceeds from step 55 to step 56 to increment the stepsize value $P_{STP}$ by $P_B$, where $P_{TX} < P_B \leq P_A$. Following step 56, the transmit power controller 18 returns to the main routine. If the decision at steps 52 and 53 is negative, the controller 18 returns the main routine without altering the stepsize $P_{STP}$.

A modified control algorithm of the transmit power controller 18 is shown in FIG. 4 in which parts corresponding in significance to those of FIG. 2 are marked with the same numerals as those used in FIG. 2. According to this modification, the SIR signal is not used. Instead, a count value K is employed to represent the length of time in which the decremented power level is lower than the lower limit $P_{MIN}$ of the power control range.

In FIG. 4, if TPC=0 at step 31, the downlink channel of a given mobile station is requesting the base station to decrease its power level. Transmit power controller 18 thus proceeds to step 32 to determine whether the difference between $P_{TX}$ and $P_{STP}$ is equal to or greater than the minimum power level $P_{MIN}$ of the base-station power control range. If the decision at step 32 is affirmative, flow proceeds to step 61 to set a count value K to 0 and decrements the power level $P_{TX}$ by the stepsize value $P_{STP}$ (step 33) and returns to the starting point of the routine.

If the decision at step 32 is negative, the count value K is incremented by one (step 62) and compared to a threshold value $T_K$ (step 63). Thus, the count value K represents the length of time that a situation $P_{TX} - P_{STP} < P_{MIN}$ continues. If K=$T_K$, the count value K is reset to 0 (step 61) and step 33 is executed by decreasing the $P_{TX}$ value by the stepsize $P_{STP}$. If K<$T_K$, flow proceeds from step 63 to step 35 to set the current value $P_{TX}$ to $P_{MIN}$. As a result, the power level $P_{TX}$ will be maintained at $P_{MIN}$ as long as the situation $P_{TX} - P_{STP} < P_{MIN}$ continues for an interval of time that corresponds to the threshold $T_K$.

Therefore, when the decision at step 63 is affirmative, it is determined that despite the fact that the transmit power of a given downlink channel has been held at minimum $P_{MIN}$ for an extended period of time, the quality of that given channel is still excellent to tolerate a further reduction of power. For this reason, the controller 18 proceeds to step 33 to further reduce the current transmit power level after resetting the K value to zero at step 61.

If TPC=1 at step 31, indicating that the mobile station is requesting a power increase, the controller 18 proceeds to step 64 to reset the count value K to zero before proceeding to decision step 36.

What is claimed is:

1. A method of controlling the transmit power of a plurality of CDMA downlink channels from a base station to a plurality of mobile stations within a control range between a nominal lower limit and a nominal upper limit, said method comprising:

receiving at the base station a request from one of the mobile stations to decrease the transmit power of a downlink channel from the base station to the one of the mobile stations;

determining whether a hypothetically decremented value of the transmit power is higher or lower than the nominal lower limit;

when the hypothetically decremented value is equal to or higher than the nominal lower limit, decreasing the transmit power when the hypothetically decremented value is lower than the nominal lower limit, decreasing the transmit power if the downlink channel has a quality equal to or higher than a specified value; and when the hypothetically decremented value is lower than the nominal lower limit, setting the transmit power to the nominal lower limit if the downlink channel has a quality lower than the specified value.

2. The method of claim 1, further comprising:

receiving, at the base station, a command signal from the one of the mobile stations requesting the base station to increase the transmit power of the downlink channel;

determining whether a hypothetically incremented value of the transmit power of the downlink channel is higher or lower than the nominal upper limit;

increasing the transmit power of the downlink channel if the hypothetically incremented value of the transmit power of the downlink channel is equal to or lower than the nominal upper limit;

if the hypothetically incremented value of the transmit power is higher than the nominal upper limit, determining whether the total transmit power of all the downlink channels is higher or lower than a specified threshold value;

increasing the transmit power of the downlink channel if the total transmit power of all the downlink channels is equal to or lower than the specified threshold value even when the hypothetically incremented value of the transmit power of the downlink channel is greater than the nominal upper limit; and setting the transmit power of the downlink channel equal to the nominal upper limit if the hypothetically incremented value of the transmit power of the downlink channel is greater than the nominal upper limit and the total transmit power of all the downlink channels is equal to or higher than the specified threshold value.

3. The method of claim 1, further comprising:

receiving, at the base station, a quality-indicating signal from the mobile station indicating the quality of the downlink channel; and determining whether the quality of the downlink channel, as indicated by the quality-indicating signal, is higher or lower than the specified value.

4. The method of claim 3, wherein the quality indicating-signal represents a signal-to-interference ratio of the downlink channel at the mobile station.

5. The method of claim 1, wherein when the hypothetically decremented value is higher than the lower limit, the transmit power is decreased by a stepsize value which varies depending on the length of time during which the transmit power has been lower than a predetermined level.

6. The method of claim 5, further comprising:
incrementing a count value if the power level is lower than the predetermined level; and
increasing the stepsize value when the count value reaches a predetermined value.

7. The method of claim 1, wherein when the hypothetically decremented value is lower than the nominal lower limit and the downlink channel has a quality higher than the specified value, the transmit power is decreased by a stepsize value which varies depending on the length of time during which the transmit power has been lower than a predetermined level.

8. The method of claim 7, farther comprising:
incrementing a count value if the power level is lower than the predetermined level; and
increasing the stepsize value when the count value reaches a predetermined value.

9. The method of claim 1, wherein setting the transmit power to the nominal lower limit comprises:
incrementing a count value as long as the hypothetically decremented value is lower than the nominal lower limit;
setting the transmit power to the nominal lower limit if the count value is smaller than a predetermined count value; and
decreasing the transmit power if the count value reaches the predetermined count value.

10. A CDMA communication system comprising:
a plurality of mobile stations; and
a base station for establishing a plurality of downlink channels to said mobile stations; receiving a power command signal from one of said mobile stations requesting said base station to decrease the transmit power of a downlink channel to the one of the mobile stations; detecting whether a hypothetically decremented value of the transmit power is higher or lower than a nominal lower limit of a power control range; if the hypothetically decremented value is equal to or higher than the nominal lower limit, decreasing the transmit power of the downlink channel; if the hypothetically decremented value is lower than the nominal lower limit, decreasing the transmit power of the downlink channel if the downlink channel has a quality equal to or higher than a specified value; and if the hypothetically decremented value is lower than the nominal lower limit, setting the transmit power to the nominal lower limit if the quality of the downlink channel is lower than the specified value.

11. The CDMA communication system of claim 10, wherein said base station is arranged to:
receive a command signal from said one of said mobile stations requesting said base station to increase the transmit power of the downlink channel;
determine whether a hypothetically incremented value of the transmit power is higher or lower than a nominal upper limit of the power control range;
increase the transmit power of the downlink channel if the hypothetically incremented value of the transmit power is equal to or lower than the nominal upper limit;
if the hypothetically incremented value of the transmit power of the downlink channel is higher than the nominal upper limit, determine whether the total transmit power of all the downlink channels is higher or lower than a specified threshold value;
increase the transmit power of the downlink channel if total transmit power of all the downlink channels is equal to or lower than the specified threshold value even when the hypothetically incremented value is greater than the nominal upper limit; and
set the transmit power of the downlink channel equal to the nominal upper limit if the hypothetically incremented value is greater than the nominal upper limit and the total transmit power of all the downlink channels is equal to or higher than the specified threshold value.

12. The CDMA communication system of claim 10, wherein said base station is arranged to:
receive a quality-indicating signal from said one of said mobile stations indicating the quality of the downlink channel at said one of said mobile stations;
determine whether the quality of the downlink channel indicated by the quality-indicating signal is higher than the specified value; and
decrease the transmit power if the quality is higher than the specified value.

13. The CDMA communication system of claim 12, wherein the quality-indicating signal represents a signal-to-interference ratio of the downlink channel at said mobile station.

14. The CDMA communication system of claim 12, wherein said base station is arranged to decrement the transmit power by a stepsize value which varies depending on the length of time during which the transmit power has been lower than a predetermined value.

15. The CDMA communication system of claim 14, wherein said base station is arranged to increment a count value if the transmit power is lower than a predetermined level and increase the stepsize value when the count value reaches a predetermined value.

16. The CDMA communication system of claim 12, wherein said base station is arranged to:
increment a count value if the hypothetically decremented value is lower than the nominal lower limit;
set the transmit power of the downlink channel to the nominal lower limit if the count value is smaller than a predetermined count value, and
decrease the transmit power if the count value reaches the predetermined count value.

* * * * *